Patented May 12, 1953

2,638,473

UNITED STATES PATENT OFFICE 2,638,473

METHINE DYESTUFFS

Harry Derek Edwards, Ilford, England, assignor to Ilford Limited, Ilford, England, a British company No Drawing. Application September 22, 1949, Serial No. 117,268. In Great Britain October 2, 1948

11 Claims. (Cl. 260—304)

This invention relates to methine dyestuffs and particularly to dyestuffs having a substituted methine chain.

In co-pending application Serial No. 117,265, now U. S. Patent No. 2,534,112, corresponding to British application No. 25,725/48 filed on even date herewith there is described the production of intermediates of the general formula:

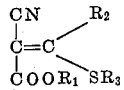

where $R_1$ and $R_2$ are alkyl groups and $R_3$ is an alkyl or aralkyl group. As explained in that application, $R_1$ and $R_2$ may be alkyl groups containing 1 to 12 carbon atoms, such as methyl, ethyl, hexyl, octyl and dodecyl, and $R_3$ may be any of such alkyl groups or an aralkyl group, e. g. benzyl or naphthylmethyl.

The preferred intermediates according to the said application have the formula:

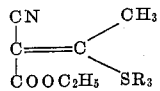

or

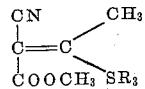

As explained in the said application, the compounds of the said formula may exist in the alternative stereoisomeric form represented by the formula:

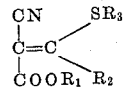

Accordingly the formula

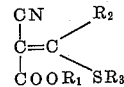

used herein and in the following claims is to be understood to include the stereoisomeric form represented by the said alternative formula.

The $SR_3$ groups in such intermediates have been found to be reactive and according to the present invention dyestuffs are obtained by reacting a compound of the foregoing general formula with a alkyl or aralkyl quaternary salt of a five-membered or six-membered heterocyclic nitrogen compound of the type used in cyanine dyes, having a reactive methylene group in $\alpha$ or $\gamma$ position to the quaternary nitrogen atom. By a reactive methylene group is meant a substituent $-CH_2R_4$ where $R_4$ is a hydrogen atom or an alkyl group, e. g. any of those mentioned above.

The course of the reaction is believed to be as follows:

$$\underset{(a)}{\overset{\lceil---D---\rceil}{N}=(CH-CH)_n=\overset{|}{C}-CH_2R_4} + \underset{(b)}{R_3S-\overset{CN}{\underset{|}{C}}=\overset{|}{\underset{COOR_1}{C}}}$$

$$\underset{(c)}{\overset{\lceil---D---\rceil}{N}-(CH=CH)_n-\overset{|}{\underset{R_4}{C}}=\overset{|}{\underset{R_2}{C}}-\overset{CN}{\underset{|}{\underset{COOR_1}{C}}} + R_3SH + HX}$$

In the foregoing formulae $R_5$ represents an alkyl or aralkyl group, e. g. any of those mentioned above, X represents an acid radicle, e. g. chloride, bromide, iodide, sulphate or $p$-toluene sulphonate, $n$ is nought or one and D is the residue of the five-membered or six-membered heterocyclic nitrogen nucleus.

The residue D may be, for example, the residue of any of the types of heterocyclic nuclei commonly employed in photographic sensitising dyes, e. g. thiazoles, oxazoles, selenazoles and their polycyclic homologues such as those of the benzene, naphthalene, acenaphthene and anthracene series, pyridine and its polycyclic homologues such as quinoline and $\alpha$ and $\beta$ naphthoquinolines, lepidines, indolenines, diazines such as pyrimidines and quinazolines, diazoles such as thio-$\beta\beta'$-diazole, oxazolines, thiazolines and selenazolines. The polycyclic compounds of these series may be substituted in the carbocyclic rings by one or more groups such as alkyl, aryl, amino, hydroxy, alkoxy and methylene-dioxy groups or by halogen atoms.

The reaction is preferably effected in the presence of a basic condensing agent, e. g. a basic organic agent such as pyridine or triethylamine.

The following examples will serve to illustrate the invention, but are not to be regarded as limiting it in any way:

EXAMPLE 1

*Ethyl 4-(3-ethyl-2:3-dihydrobenzthiazolylidene-2-) 3-methyl-2-cyano-2-butenoate*

Ethyl 2-cyano-3-ethylthio-2-butenoate (0.398 gms.; 0.002 mol.) was boiled bently under reflux for 15 minutes in 10 cc. spirit with methyl benz-thiazole ethiodide (0.6 gms.; 0.002 mol.) and triethylamine (0.3 cc.; 0.002 mol.). The solution changed colour rapidly from yellow to orange and the heating was stopped when the colour began to change to dark red.

On cooling and diluting with 5 cc. water the product crystallised out giving orange crystals, M. Pt. 148° C. Crystallisation from ethyl alcohol gave yellow crystals with M. Pt. 154° C. Recrystallisation from ethyl alcohol raised the M. Pt. to 156° C.

EXAMPLE 2

*Ethyl 4-(3-methyl-2:3-dihydro-4:5-benz-benzthiazolylidene-2-) 3-methyl-2-cyano-2-butenoate*

2-methyl-β-naphthathiazole (1.005 gms.; .005 mol.) and methyl *n*-toluene sulphonate (.796 gm.; .005 mol.) were fused together for 6 hours at 160° C. Ethyl 2-cyano-3-ethylthio-2-butenoate (1.0 gm.; .005 mol.) was then added and the mixture boiled for 10 minutes under reflux in 25 cc. ethyl alcohol with triethylamine (.75 cc.; .005 mol.). An orange-red colour developed. On pouring out the product crystallised giving yellow crystals, M. Pt. 216° C. Two recrystallisations from methyl alcohol raised the M. Pt. to 226°.

EXAMPLE 3

*Ethyl 4(3-ethyl-2:3-dihydrobenzthiazolylidene-2-) 3-ethyl-2-cyano-2-butenoate.*

Ethyl 2-cyano-3-ethylthio-2-pentenoate (.422 gm.; .002 mol.) and methyl benzthiazole ethiodide (0.6 gm.; .002 mol.) were boiled gently under reflux in ethyl alcohol (10 cc.) with triethylamine (.3 cc.; .002 mol.) for 5 minutes giving a red solution. Dilution with water precipitated orange crystals, M. Pt. 122° C. Crystallisation from ethyl alcohol gave M. Pt. 127° C. Second crystallisation from ethyl alcohol gave M. Pt. 129° C.

EXAMPLE 4

*Ethyl 4-[3-methyl-2:3-dihydro-benzthiazolylidene-2-]-3-methyl-2-cyano-2-butenoate*

Methyl benzthiazole (.745 gm.; .005 mol.) was fused with methyl para toluene sulphonate (.93 gm.; .005 mol.) at 100° C. for 1½ hours. Ethyl-2-cyano-3-methylthio-2-butenoate (.925 gm.; .005 mol.) was added and the mixture boiled gently under reflux for 10 minutes in ethyl alcohol (20 cc.) with triethylamine (.75 cc.; .005 mol.). On cooling and dilution yellow crystals separated. M. Pt. 200° C. (No second crop was obtained on further dilution.) Crystallisation from methyl alcohol gave M. Pt. 201° C. Recrystallisation from methyl alcohol did not raise the melting point.

Corresponding compounds may be prepared by strictly analogous processes from quaternary salts of 2-methyl quinoline, 4-methyl quinoline and other 2-alkyl and 4-alkyl quinolines, from quaternary salts of 2-methyl, 2-ethyl and 2-higher alkyl-benzselenazoles and benzoxazoles, from quaternary salts of 2.3.3 trialkyl indolenines, e. g. 2.3.3 trimethyl indolenine methiodide and from quaternary salts of 2-methyl, 2-ethyl and 2-higher alkyl thiazolines, selenazolines and oxazolines. The quaternary salts used may in each case be an alkyl or aralkyl, e. g. methyl or benzyl, iodide, bromide, hydrogen sulphate or p-toluene sulphonate.

The dyestuffs obtained according to the present invention are valuable sensitisers for silver halide photographic emulsions. Thus, for example, the product of Example 2, incorporated in a gelatino silver iodobromide emulsion, extends the sensitivity of the emulsion to about 530 m$\mu$ with a maximum at about 480 m$\mu$, and the product of Example 3 similarly employed extends the sensitivity to about 520 m$\mu$ with a strong peak maximum at about 480 m$\mu$.

What I claim is:

1. A compound of the general formula:

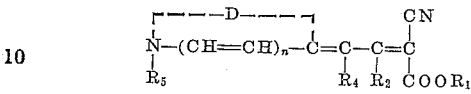

where $R_1$ and $R_2$ are alkyl groups, $R_4$ is selected from the class consisting of the hydrogen atom and alkyl groups, $R_5$ is selected from the class consisting of alkyl and aralkyl groups D is selected from the class consisting of the residues of five-membered and six-membered heterocyclic nitrogen nuclei of the type used in cyanine dyes, and $n$ is selected from nought and one.

2. Process for the production of a dyestuff of the general formula:

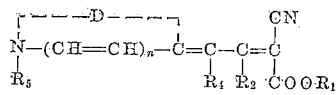

where $R_1$ and $R_2$ are alkyl groups, $R_4$ is selected from the class consisting of the hydrogen atom and alkyl groups, $R_5$ is selected from the class consisting of alkyl and aralkyl groups, $n$ is selected from nought and one, and D is selected from the class consisting of the residues of five-membered and six-membered heterocyclic nitrogen nuclei of the type used in cyanine dyes, which comprises reacting a compound of the general formula:

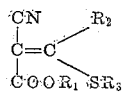

where $R_3$ is selected from the class consisting of alkyl and aralkyl groups and the other symbols have the meanings assigned to them above, with a molecular equivalent of a compound of the general formula:

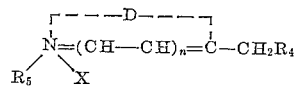

where X is an acid radicle and the other symbols have the meanings assigned to them above.

3. Process for the production of a dyestuff of the general formula:

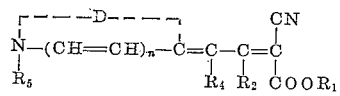

where $R_1$ and $R_2$ are alkyl groups, $R_4$ is selected from the class consisting of the hydrogen atom and alkyl groups, $R_5$ is selected from the class consisting of alkyl and aralkyl groups, $n$ is selected from nought and one, and D is selected from the class consisting of the residues of five-membered and six-membered heterocyclic nitrogen nuclei of the type used in cyanine dyes, which comprises reacting a compound of the general formula:

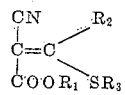

where $R_3$ is selected from the class consisting of alkyl and aralkyl groups and the other symbols have the meanings assigned to them above, with a molecular equivalent of a compound of the general formula:

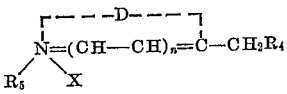

where X is an acid radical and the other symbols have the meanings assigned to them above, the reaction being effected by heating the reagents together in the presence of a basic condensing agent.

4. Process for the production of the compound ethyl 4-(3-ethyl-2:3-dihydrobenzthiazolylidene-2-) 3-methyl-2-cyano-2-butenoate of the formula:

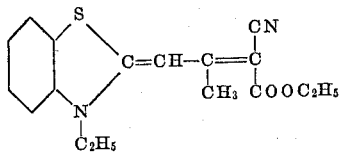

which comprises reacting ethyl 2-cyano-3-ethyl-thio-2-butenoate with an equimolecular proportion of an ethyl quaternary salt of 2-methyl benzthiazole in the presence of a basic condensing agent.

5. Process for the production of the compound ethyl 4-(3-methyl-2:3-dihydro-4:5-benz - benzthiazolylidene-2-) 3-methyl-2-cyano-2-butenoate of the formula:

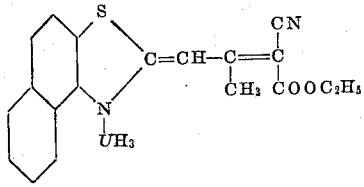

which comprises reacting ethyl 2-cyano-3-ethyl-thio-2-butenoate with an equimolecular proportion of a methyl quaternary salt of 2-methyl-β-naphthathiazole in the presence of a basic condensing agent.

6. Process for the production of the compound ethyl 4(3-ethyl-2:3 - dihydrobenzthiazolylidene-2-) 3-ethyl-2-cyano-2-butenoate of the formula:

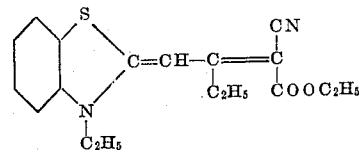

which comprises reacting ethyl 2-cyano-3-ethyl-thio-2-pentenoate with an equimolecular proportion of an ethyl quaternary salt of 2-methyl benzthiazole in the presence of a basic condensing agent.

7. Process for the production of the compound ethyl 4-(3-methyl-2:3-dihydro - benzthiazolylidene-2-)-3-methyl-2-cyano-2-butenoate of the formula:

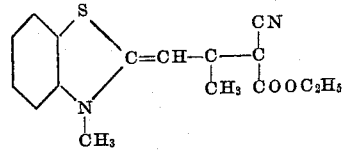

which comprises reacting ethyl 2-cyano-3-methylthio-2-butenoate with an equimolecular proportion of a methyl quaternary salt of 2-methyl benzthiazole in the presence of a basic condensing agent.

8. Ethyl 4-(3-ethyl-2:3-dihydrobenzthiazolyl-idene-2-) 3-methyl-2-cyano-2-butenoate of the formula:

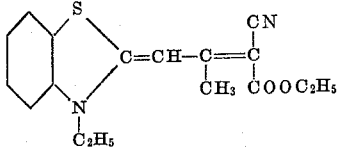

9. Ethyl 4-(3-methyl-2:3-dihydro-4:5 - benz-benzthiazolylidene-2-) 3-methyl-2-cyano-2-butenoate of the formula:

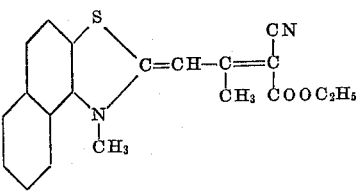

10. Ethyl 4(3-ethyl-2:3-dihydrobenzthiazolyl-idene-2-)-3-ethyl-2-cyano-2 - butenoate of the formula:

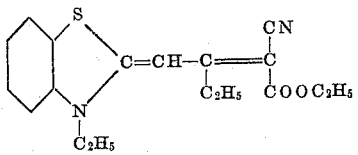

11. Ethyl 4-(3-methyl-2:3-dihydro - benzthiazolylidene-2-)-3-methyl-2-cyano-2 - butenoate of the formula:

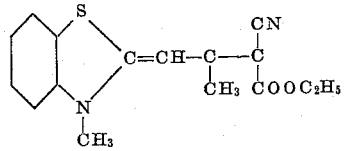

HARRY DEREK EDWARDS.

References Cited in the file of this patent

UNITED STATES PATENTS

| Number | Name | Date |
|---|---|---|
| 1,637,790 | Teppema | Aug. 2, 1927 |
| 1,891,198 | Clifford | Dec. 12, 1932 |
| 2,112,162 | Kendall | Mar. 22, 1938 |
| 2,166,736 | White et al. | July 18, 1939 |
| 2,263,749 | White et al. | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,471,488 | Kendall | May 31, 1949 |

FOREIGN PATENTS

| Number | Country | Date |
|---|---|---|
| 431,141 | Great Britain | 1935 |

OTHER REFERENCES

Chemical Abstracts 16:3101 (Abstract of Brit. Med. Journal, 1922, I, 514–515).

Chemical Abstracts 19:530 (Abstract of Proc. Roy. Soc., London, 96B 317–333, 1924).

Patterson, "Ring Index," Reinhold Publishing Co., p. 41 (1940).